May 24, 1938.  A. W. MORTON  2,118,474
PORTABLE SUN AND WIND SHELTER FOR BEACH OR LIKE USE
Filed July 1, 1936
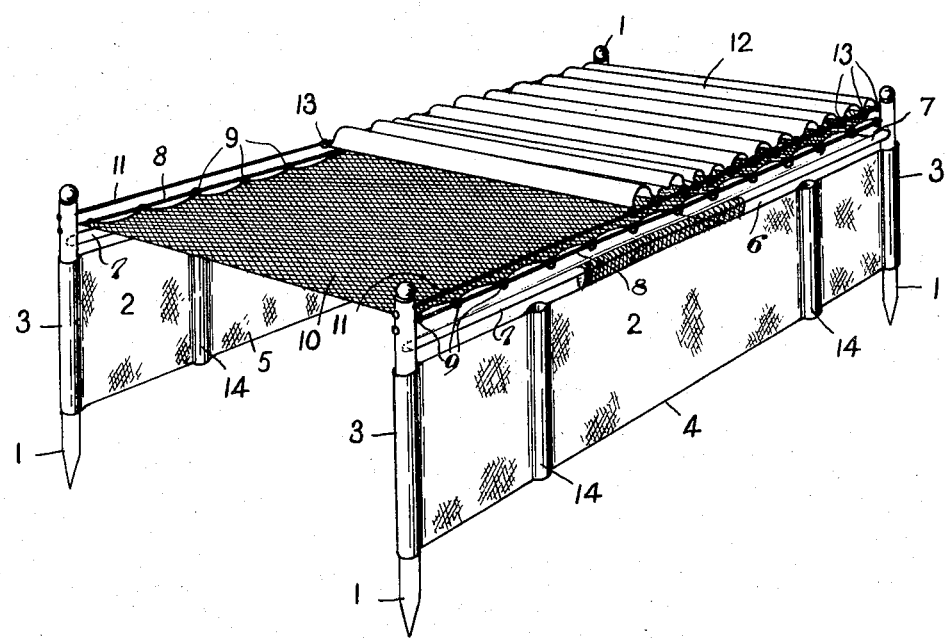
Inventor.
Agnes Whitton Morton,
By Watson E. Coleman.
Attorney Patented May 24, 1938

2,118,474

UNITED STATES PATENT OFFICE 2,118,474

PORTABLE SUN AND WIND SHELTER FOR BEACH OR LIKE USE

Agnes Whitton Morton, Radlett, England

Application July 1, 1936, Serial No. 88,466
In Great Britain July 1, 1935

12 Claims. (Cl. 135—5)

This invention relates to portable sun and wind shelters for beach or like use and has for its object to provide an improved shelter which shall be such that an occupant will be able to achieve a sun-tanned appearance without experiencing the discomforts at present attendant thereon and which shall be capable of being widely varied in form, in a simple and rapid manner, to suit the occupant's wishes.

According to the invention the shelter comprises a number of supporting posts or stakes adapted to carry fabric walls or wind screens capable of being arranged to constitute an enclosure, which may be partly or completely open at one side, and a screen adapted to cover over part or all of the enclosure and composed of a material pervious to the ultra-violet rays in sunlight but less pervious to the heat rays in sunlight.

In order that the nature of the invention may be clearly understood, one construction of a sun and wind shelter in accordance therewith will now be described in some detail in connection with its assembly for use and with reference to the accompanying drawing which is a perspective view of the improved sun and wind shelter.

A suitable number of round posts 1 are driven into the sand of a beach, for example, to constitute the four corner posts of a rectangular enclosure, and a length of canvas 2 is engaged with these posts, by slipping them into tubular guides 3 formed in or on the canvas, to constitute the two longer sides 4, 5 and one end wall 6 of the rectangular enclosure. The upper edges of the canvas forming the walls of the enclosure are provided with a tubular portion engaged over longitudinal rods 7 of metal or wood, or other suitable material, between the posts 1, in order to ensure that the structure will be rigid.

It may be pointed out that the canvas is capable of being slid up or down on the posts to afford ventilation at the bottom of the enclosure if and when required.

Near their upper ends each two posts 1 disposed at the ends of each long side 4 or 5 of the rectangular enclosure are connected by a wire or cord 8 or a rigid member of any suitable material on which is threaded a number of loose rings or runners 9 and these rings or runners are stitched or otherwise secured at intervals to the corresponding edge of a gauze or muslin screen 10 which can, therefore, be caused to cover in the enclosure completely or be slid back to uncover part or all of the enclosure.

Hence a person reclining on the sand within the enclosure can expose portions of his body to the sun's rays while being protected from any wind that may be blowing and also, to some extent, from the gaze of passers-by. The gauze or muslin screen 10 when interposed between the sun and the body does not appreciably retard the tanning or bronzing of the skin but does prevent the blistering and soreness which would otherwise occur in a large number of cases.

In some cases, as when complete shade may sometimes be desired, a further pair of wires or cords or rigid members 11 may be provided above and parallel with those supporting the gauze screen 10 and a canvas screen 12 may be slidably arranged on said further pair of members by means of rings or runners 13, so that it may be drawn along the members to cover the enclosure partially or completely, as desired.

Furthermore, in order to provide for varying the shape of the enclosure, the canvas strip 2 referred to as being engaged with the posts 1 may be formed or provided with a number of additional tubular guides 14 which may be selectively engaged over the posts to produce enclosures of shapes other than rectangular. The opening to the rectangular enclosure may be arranged at one of the longer sides 4 or 5 of the enclosure or at one of the ends thereof, additional posts, preferably shorter than the posts 1, being provided to engage the tubular guides 14 in the ends of the canvas strip in the first of these cases.

When occasion demands, the covers 10 and 12 may be removed, together with their horizontal supporting members 8 and 11, and the enclosure walls opened out to constitute a simple wind shelter or the covers 10 and 12 may be retained and the depths to which the posts 1 are driven into the ground may be varied to produce an enclosure with an inclined roof beneath which the occupant may sit upright.

Although mention has been made of gauze and muslin as materials for use in making the lower screen, it should be understood that a similar type of open-mesh fabric woven from artificial silk thread would also be very suitable for the purpose in view.

The shelter described may be dismantled and packed into a canvas bag, which latter can be employed as a pillow, during the time that the shelter is erected, upon being stuffed with towels or the like.

In some cases the canvas strip forming the wind screen may be removed and the posts employed solely to support the two sun screens mentioned above.

I claim:

1. An improved portable sun and wind shelter comprising a plurality of supporting posts, a strip of fabric carried by the said posts and capable of being slid up and down thereon to afford ventilation at the bottom and a screen composed of a material pervious to the ultra-violet rays in sunlight but less pervious to the heat rays in sunlight and adapted to be extended over the enclosure.

2. An improved portable sun and wind shelter comprising four main supporting posts and a strip of fabric carried by the supports and capable of being slid vertically thereon, the said fabric being provided with vertical tubular guides engaging the supports.

3. An improved portable sun and wind shelter according to claim 2 including additional supporting posts and a strip of fabric provided with an additional number of tubular guides adapted to be slid up and down on the posts and engaging the supports in order to vary the shape of the enclosure.

4. An improved portable sun and wind shelter according to claim 2 comprising a plurality of supports and a strip of fabric carried by the supports the upper edges of the fabric being reinforced with lengths of rigid material.

5. An improved portable sun and wind shelter according to claim 2 including a wire connected between each pair of posts, near their upper ends, and disposed longitudinally of each side of the rectangular enclosure.

6. An improved portable sun and wind shelter according to claim 2 including a strip of fabric carried by the posts, and forming a rectangular enclosure, and a cord connected between each pair of posts, near their upper ends, and disposed longitudinally of each side of the rectangular enclosure.

7. An improved sun and wind shelter comprising a plurality of posts, a strip of fabric having means engaging the posts and constructed and arranged to be adjusted vertically on the posts the strip of fabric forming a rectangular enclosure, and a rigid member connected between each pair of posts near their upper ends and disposed longitudinally of each side of the rectangular enclosure.

8. An improved portable sun and wind shelter comprising a plurality of posts, a strip of fabric constructed and arranged to be adjusted vertically on the posts and forming a rectangular enclosure, a rigid member connected between each pair of posts near their upper ends and disposed longitudinally of each side of the rectangular enclosure and a screen formed of an open mesh fabric having a number of loose rings secured at intervals to its longer edges, the said rings being threaded over the said rigid member.

9. An improved portable sun and wind shelter comprising a plurality of posts, a strip of fabric constructed and arranged to be slid up and down on the posts and forming a rectangular enclosure, a rigid member connected between each pair of posts near their upper ends and disposed longitudinally of each side of the rectangular enclosure and an upper member connected between each pair of posts adjacent their upper ends and disposed parallel to the upper edges of the canvas forming the longitudinal sides of the enclosure.

10. A portable sun and wind shelter, including a plurality of vertical posts, a fabric strip having vertical tubular portions engageable around the posts and slidable thereon, horizontal members connecting the upper ends of the posts, a screen of sun-shielding but light pervious material slidably engaged with said horizontal members, and a substantially opaque screen slidably mounted for adjustment over the whole or a part of the first named screen.

11. A portable sun and wind shelter, including a plurality of vertical posts, a fabric strip having vertical tubular portions engageable around the posts and slidable thereon whereby the lower portion of said strip may be raised, horizontally disposed elements connecting the upper ends of the posts, a screen of sun-shielding but light pervious material having eyes slidingly engaging with said horizontal members, a second set of horizontal members disposed above the first set and connected to the posts, and a substantially opaque foldable fabric screen having eyes at its ends slidingly engaging said second set of horizontal elements.

12. A portable sun and wind shelter, including a plurality of vertical posts, longitudinally extending rods disposed between said posts, a fabric strip having vertical tubular portions through which the posts are disposed, the strip being supported along its upper edge from said horizontal rod, wires connecting the upper ends of the vertical posts, a screen of sun-shielding but light pervious material having eyes at its side edges engaging said wires, a second set of wires disposed above the first and extending between the posts, and a substantially opaque foldable screen of fabric having eyes at its edges slidingly engaging the said last named wires.

AGNES WHITTON MORTON.